United States Patent
Nair et al.

(10) Patent No.: US 7,333,572 B2
(45) Date of Patent: Feb. 19, 2008

(54) VITERBI EQUALIZATION USING A TABLE MEMORY FOR PROVISION OF RECONSTRUCTED SIGNAL VALUES FOR THE CALCULATION OF TRANSITION METRICS

(75) Inventors: Anish Nair, New Delhi (IN); Santosh Nath, Haryana (IN)

(73) Assignee: Infineon Technologies AG (DE)

( * ) Notice: Subject to any disclaimer, the term of this patent is extended or adjusted under 35 U.S.C. 154(b) by 679 days.

(21) Appl. No.: 10/841,120

(22) Filed: May 7, 2004

(65) Prior Publication Data

US 2005/0038841 A1 Feb. 17, 2005

Related U.S. Application Data

(63) Continuation of application No. PCT/DE02/04065, filed on Oct. 31, 2002.

(30) Foreign Application Priority Data

Nov. 9, 2001 (DE) ................ 101 55 061

(51) Int. Cl.
   *H04L 27/06* (2006.01)
(52) U.S. Cl. ............. 375/341; 375/262; 714/795
(58) Field of Classification Search ........... 375/262, 375/265, 340–341, 232–233; 714/792, 794–796
   See application file for complete search history.

(56) References Cited

U.S. PATENT DOCUMENTS

| 5,619,533 | A | * | 4/1997 | Dent | ............. 375/232 |
|---|---|---|---|---|---|
| 6,381,271 | B1 | * | 4/2002 | Javerbring | ............. 375/233 |
| 6,580,769 | B1 | * | 6/2003 | Brown et al. | ............. 375/341 |
| 6,622,283 | B1 | * | 9/2003 | Cohen | ............. 714/794 |
| 7,099,410 | B1 | * | 8/2006 | Chennakeshu et al. | ..... 375/341 |

FOREIGN PATENT DOCUMENTS

| DE | 100 32 237 A1 | 1/2002 |
|---|---|---|
| EP | 0 616 453 B1 | 3/1994 |
| WO | WO 98/27701 | 6/1998 |
| WO | WO 00/10299 | 2/2000 |

OTHER PUBLICATIONS

Duel-Hallen et al.; "Delayed Decision-Feedback Sequence Estimation"; IEEE Translations on Communications, New York; vol. 37, No. 5, pp. 428-436, May 1, 1989.

(Continued)

*Primary Examiner*—Khanh C. Tran
(74) *Attorney, Agent, or Firm*—Dickstein, Shapiro, LLP.

(57) ABSTRACT

In a method for equalization of a data signal based on the Viterbi algorithm, trellis contributions are first of all calculated for reconstructed signal values from transition metrics, and are stored in a first table memory. If a reduced trellis diagram is intended to be used as the basis for calculation of the transition metrics, decision feedback contributions are also calculated, and are stored in a further table memory. In the case of ACS operations, the first and, if appropriate, the further table memories are accessed in order to determine the reconstructed signal values.

20 Claims, 3 Drawing Sheets

OTHER PUBLICATIONS

Kenney, et al.; "Parallel architecture for Multilevel Decision Feedback Equalization"; IEEE Transactions on Magnetics, New York, vol. 34, No. 2; pp. 588-595, Mar. 1998.

Peter Jung; "Entwurf und Realisierung von Viterbi-Detektoren fur Mobilfunkkanale"; Dusseldorf, VDI Verlag, No. 238; pp. 63-77 and 120-132, 1993.

J.A. Erfanian et al.; "Reduced Complexity Symbol Detectors with Parallel Structures"; IEEE Global Telecommunications Conference; vol. 2, pp. 704-708, 1990.

D. Raphaeli et al.; "A Reduced complexity Algorithm for combined Equalization and Decoding for Channels with Multipath, ISI or Partial Response"; IEEE Globel Telecommunications Conference; vol. 1, pp. 83-87, 1995.

* cited by examiner

| v | Tr. State |
|---|---|
| 1 | 0000 |
| 2 | 0001 |
| 3 | 0010 |
| 4 | 0011 |
| ⋮ | ⋮ |
| 16 | 1111 |

Fig.2

TAB1

| Addr | State | s(j) | Trellis Contr |
|---|---|---|---|
| 1 | 0000 | 0 | S(1,1) |
| 2 | 0000 | 1 | S(1,2) |
| 3 | 0001 | 0 | S(2,1) |
| 4 | 0001 | 1 | S(2,2) |
| ⋮ | ⋮ | ⋮ | ⋮ |
| 15 | 0111 | 0 | S(8,1) |
| 16 | 0111 | 1 | S(8,2) |
| 17 | 1000 | 0 | S(9,1) |
| 18 | 1000 | 1 | S(9,2) |
| 19 | 1001 | 0 | S(10,1) |
| ⋮ | ⋮ | ⋮ | ⋮ |
| 32 | 1111 | 1 | S(16,2) |

$s(j_2)\ s(j_1)$  TAB2

| 0 0 | DF (1,1) |
| 0 1 | DF (2,1) |
| 1 0 | DF (1,2) |
| 1 1 | DF (2,2) |

$DF(1,1) = h_5 \cdot 0 + h_6 \cdot 0 = 0$
$DF(2,1) = h_5 \cdot 1 + h_6 \cdot 0 = h_5$
$DF(1,2) = h_5 \cdot 0 + h_6 \cdot 1 = h_6$
$DF(2,2) = h_5 \cdot 0 + h_6 \cdot 1 = h_5 + h_6$

Fig. 5

TAB3

| Addr | DF Contr |
| 1 | DF (1,2) |
| 2 | |
| 3 | |
| 4 | |
| ... | |
| 16 | |

Occupancy at time k: $s_{k-6}\ s_{k-5}\ s_{k-4}\ s_{k-3}\ s_{k-2}\ s_{k-1}\ s_k$
State (Gl.7):  $s(1)\ s(2)\ s(3)\ s(4)$ 1 0 0 0 0 0

$\underbrace{\phantom{xxx}}_{DF(1,2)}\ \underbrace{\phantom{xxx}}_{v=1}$

VITERBI EQUALIZATION USING A TABLE MEMORY FOR PROVISION OF RECONSTRUCTED SIGNAL VALUES FOR THE CALCULATION OF TRANSITION METRICS

CROSS REFERENCE TO RELATED APPLICATION

This application is a continuation of copending International Application No. PCT/DE02/04065 filed Oct. 31, 2002 which designates the United States, and claims priority to German application no. 101 55 061.8 filed Nov. 9, 2001.

TECHNICAL FIELD OF THE INVENTION

The present invention generally relates to a method for equalization of a data signal, which is transmitted via a channel, based on the Viterbi algorithm, and to an apparatus for this purpose.

DESCRIPTION OF RELATED ART AND BACKGROUND OF THE INVENTION

In the case of radio transmission, the data signals which are transmitted via the air interface have to be subjected to adaptive equalization in order to take account of the characteristics of the physical transmission channel. Multipath propagation of the transmitted data signal, which results in intersymbol interference (ISI), results in particular in difficulties in signal detection.

Figure 1A:
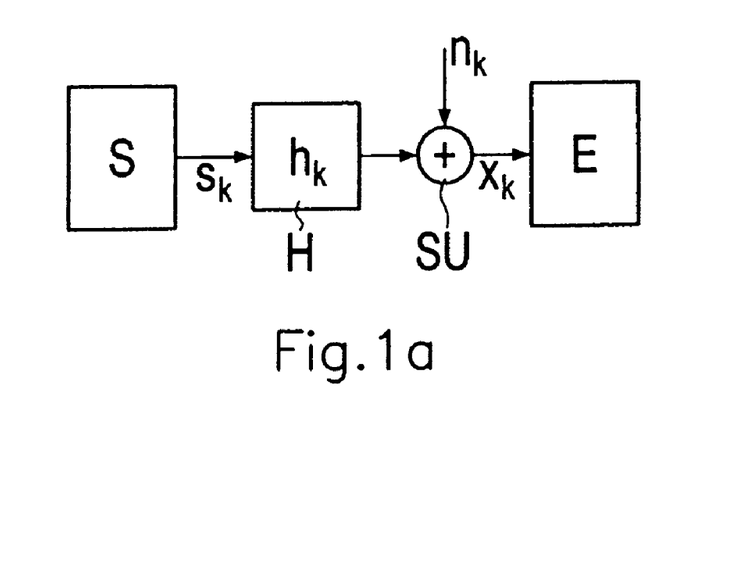
FIG. 1a shows a schematic illustration of a model of the physical transmission channel.

The multipath transmission channel between a transmitter S and a receiver E can be modeled as a transmission filter H with channel coefficients $h_k$, as is illustrated in FIG. 1a. The transmitter S feeds transmission data or transmission symbols $s_k$ into the transmission channel, that is to say the transmission filter H. An additive noise signal $n_k$ can be taken into account by a model adder SU, and is added to the transmission symbols $s_k$, which have been filtered with $h_k$, at the output of the transmission filter H.

The index k denotes the discrete time, represented by time steps. The transmission signals $s_k$ which have been filtered by the transmission filter H and on which noise is superimposed are received as the received signal $x_k$ by the receiver. In this case:

$$x_k = \sum_{i=0}^{L} h_i s_{k-i} + n_k \quad (1)$$

where L represents the order of the transmission channel that is modeled by the filter H. As can be seen from equation 1, this includes ISI, since $x_k$ depends not only on $s_k$ but also on $s_{k-1}, \ldots, s_{k-L}$.

The received signal values $x_k$ are known as sample values in the receiver E, and the channel impulse responses $h_0, h_1, \ldots, h_L$ of the channel are estimated at regular time intervals. The equalization task comprises the calculation of the transmission symbols $s_k$ from this information. The following text considers equalization by means of a Viterbi equalizer.

Viterbi equalizers are recursive MLSE (Maximum Likelihood Sequence Estimation) sequence estimators. Sequence estimation is based on finding the shortest route through a state diagram for the channel, which is known as a trellis diagram. The channel states are plotted against the discrete time k in the trellis diagram. According to the Viterbi algorithm, a transition metric is calculated for each possible transition between two states (previous state→target state), and represents a measure of the probability of that transition. The transition metrics are then added to the respective state metrics of the previous states, and the sums obtained in this way are compared. That transition whose sum of the transition metric and the metric of the previous state is a minimum is selected, and forms the extension of the path which leads in this previous state to the target state. These three operations are referred to as ACS (ADD COMPARE SELECT) operations.

The Viterbi algorithm results in the number of paths through the trellis diagram remaining constant as k increases (that is to say as the time progresses). This allows the MLSE to be solved by calculation.

The computation complexity of the Viterbi algorithm increases exponentially with L. This is due to the fact that the number of channel states in the trellis diagram is $m^L$. In this case, m denotes the value of the data symbols being considered.

In order to increase the data rate, higher-value symbols (for example 8PSK symbols, that is to say phase shift keying with m=8) have been used increasingly in recent times instead of binary symbols (m=2). This considerably increases the computation complexity for Viterbi equalization.

Attempts have been made to cope with the increasing computation requirement by means of fast hardware data paths (coprocessors) in the hardware. These hardware modules, which are also referred to as "Viterbi supports" carry out the calculation for the ACS operations partially or entirely in hardware. One such equalizer is described, for example, in the international patent application WO 00/70614.

The decision feedback (DF) method is an algorithmic approach to reduce the computation complexity. In the DF method, the Viterbi algorithm is based on a reduced trellis diagram, that is to say a trellis diagram in which only some of the $m^L$ channel states are taken into account, rather than all of them. If the trellis diagram is reduced to $m^{L_T}$ trellis states where $L_T < L$, the remaining $L - L_T$ channel coefficients are used only for the calculation of the transition metrics in the reduced trellis diagram (but not for the definition of states).

However, a transition metric must always be calculated for each possible transition between two states. The transition metric is the Euclidean distance between the measured signal value $x_k$ and a reconstructed "hypothetical" signal value which is calculated in the receiver with respect to the two states (previous state, target state) which characterize the transition, taking into account the channel knowledge. The practical implementation of the calculation of the transition metrics as a function of the system concept (in particular the task distribution between hardware and software) is of critical importance for the complexity which has to be accepted for Viterbi equalization.

SUMMARY OF THE INVENTION

The invention is based on the object of providing a method for Viterbi equalization which reduces the computation complexity for calculation of the transition metrics. A further aim of the invention is to provide an apparatus for Viterbi equalization of a data signal with a low level of computation complexity. One particular aim is to save hardware as a result of the low level of computation complexity.

According to an embodiment of the invention, $L_T$ symbols are taken into account in the trellis state diagram in order to define a trellis state (which then results in $m^{L_T}$ trellis states), and L+1 channel parameters $h_0, h_1, \ldots, h_L$ are determined for the channel estimation, where $L \geq L_T$. This means that the trellis diagram may be complete ($L=L_T$) or reduced ($L>L_T$). For each of the possible state transitions in the trellis diagram, one and only one trellis contribution is calculated in advance for the reconstructed signal value for this state transition. The $m^{L_T+1}$ trellis contributions are stored in a first table memory. When carrying out the ACS operations, the reconstructed signal value which is required for the calculation of a transition metric for the case $L=L_T$ (that is to say for a trellis diagram which has not been reduced) is determined by access to the first table memory. For the case where $L>L_T$ (reduced trellis diagram), the required reconstructed signal value is determined by access to the first table memory and to at least one further table memory.

The advantage of the method according to the invention is that, when calculating each transition metric, the reconstructed signal value is determined simply by reading one memory location (in the case where $L=L_T$) or by reading two memory locations (in the case where $L>L_T$). In this case, the trellis contributions which are stored in the first table memory need be updated only after a channel re-estimation process, that is to say they generally remain unchanged over a large number of time steps. Since the trellis contribution for $L=L_T$ is identical to the reconstructed signal value of a transition metric, only the Euclidean distance between the sample value obtained for this time step and the respective trellis contribution read from the first table memory need be formed for the calculation of each transition metric in this case. Thus, in this case, the processing of the ACS operations does not involve any computation complexity whatsoever for determination of the reconstructed signal values of the transition metrics.

One particularly preferred refinement of the method according to the invention is characterized in that the trellis contributions are stored in the first table memory with respect to a state index v at sequential memory addresses, in particular at the addresses Adr=j+(v-1)*m for indexing of the $m^{L_T}$ trellis states where v=1, ..., $m^{L_T}$. This means that all that is required for calculation of the transition metrics in the course of the ACS operations for one time step is to increment and/or decrement the access address for the first table memory.

For the case where $L-L_T=df \geq 1$ (reduced trellis diagram), one preferred method implementation is characterized in that, before carrying out the ACS operations, the steps of calculation of $m^{df}$ decision feedback contributions for the transition metrics based on the channel parameters $h_{L_T+1}, \ldots, h_L$ and the storage of the decision feedback contributions in a second table memory are also carried out over a number of time steps until the next estimation of channel parameters.

The df channel parameters $h_{L_T+1}, \ldots, h_L$ are preferably taken into account in the calculation of the reconstructed signal values in that, in each time step k, each trellis state is allocated that address in the second table memory at which the decision feedback contribution to be taken into account for this trellis state for the time step k is stored.

In the course of the processing of the ACS operations, the decision feedback contributions can be read directly from the second table memory by means of these addresses. An alternative procedure is to re-store the decision feedback contributions in a third table memory with a state-indexed address, before carrying out the ACS operations for the time step k under consideration. This re-storage process must be carried out once again for each time step k. However, it is advantageous that the re-storage process can in each case be carried out such that the third table memory can then be read in the course of the processing of the ACS operations in each time step (in precisely the same way as the first table memory) by incrementation or decrementation of the memory address.

An apparatus which is designed to carry out the method according to the invention accordingly has a first table memory, which uses $m^{L_T+1}$ memory locations, and a processor, which has an access to the first table memory, for calculation of the transition metrics for carrying out the ACS operations.

Provided that the Viterbi equalization is based on a reduced trellis diagram, the apparatus furthermore has a second table memory which uses $m^{L-L_T}$ memory locations for storage of decision feedback contributions, and which has an access to the processor. The decision feedback contributions which are calculated in advance after each channel estimation process for the reconstructed signal values of the transition metrics are stored in this memory.

The apparatus furthermore preferably has a third table memory, which uses $m^{L_T}$ memory locations, for state-indexed storage of decision feedback contributions for each time step, and which has an access to the processor. As already mentioned, the third table memory may be read in the case of DF equalization by incrementation/decrementation of the memory address.

A trellis contribution can be calculated using $$s(v, j) = \sum_{i=1}^{L_T} h_i s^{(v)}(L_T + 1 - i) + h_0 s(j),$$

where m denotes the value of the symbols on which the data signal is based, $s(j), j=1,\ldots,m$ denotes these m symbols and the $L_T$ tuple indicates a trellis state with the index v, $v=1,\ldots,m^{L_T}$, while $s^{(v)}(n), n=1,\ldots,L_T$ denotes the symbol which is in the n-th place in the $L_T$ tuple. Each trellis contribution can be determined by a single read access to the first table memory. The trellis contributions can be stored in the first table memory with respect to a state index v at sequential memory addresses, in particular at the addresses Adr=j+(v-1)*m for indexing of the $m^{L_T}$ trellis states where $v=1,\ldots,m^{L_T}$. In order to determine the $m^{L_T+1}$ trellis contributions which are required for the ACS operations for one time step, the address thereof can be incremented or decremented for access to the first table memory. The mdf decision feedback contributions can be calculated using $DF(j_1,\ldots,j_{df})=h_{L_T+1}s(j_1)+\ldots+h_L s(j_{df})$, where the indices $j_1,\ldots,j_{df}$ may each assume the values $1,\ldots,m$, and $s(\cdot)$ is the symbol which is determined by the respective index $j_1,\ldots,j_{df}$. For a state index on the basis of $v=1,\ldots,m^{L_T}$, the decision feedback contribution to be taken into account for the trellis state with the index v for the time step k can be stored at the address Adr=v in the third table memory. With respect to one time step for determination of the $m^{L_T+1}$ reconstructed signal values for each trellis state, m read accesses can be made to the first table memory and one read access can be made to the third table memory, and each reconstructed signal value can be obtained by addition of a trellis contribution, which is read from the first table memory, and a decision feedback contribution which is read from the third table memory. Read accesses to the first and third table memories can be made in the course of processing the ACS operations for one time step, with the respective access addresses being incremented and/or decremented.

BRIEF DESCRIPTION OF THE DRAWINGS

The invention will be described in the following text using exemplary embodiments and with reference to the drawing, in which.

DETAILED DESCRIPTION OF EMBODIMENTS

The principles of Viterbi equalization will be described briefly first of all. The Viterbi equalization method is based on the time-discrete multipath transmission channel being modeled by the transmission filter H which is shown in more detail in FIG. 1b. The filter H has a shift register comprising L memory cells Z. There are taps (a total of L+1 of them) in front of and behind each memory cell Z, and these lead to multipliers which multiply the values of the symbols $s_k$, $s_{k-1}, \ldots, s_{k-L}$, which have been inserted into the shift register by an input IN, by the corresponding channel impulse responses $h_0, h_1, \ldots, h_L$. An output stage AD of the filter H adds the outputs from the L+1 multipliers, thus resulting in an output signal OUT as in equation 1.

Figure 1B:
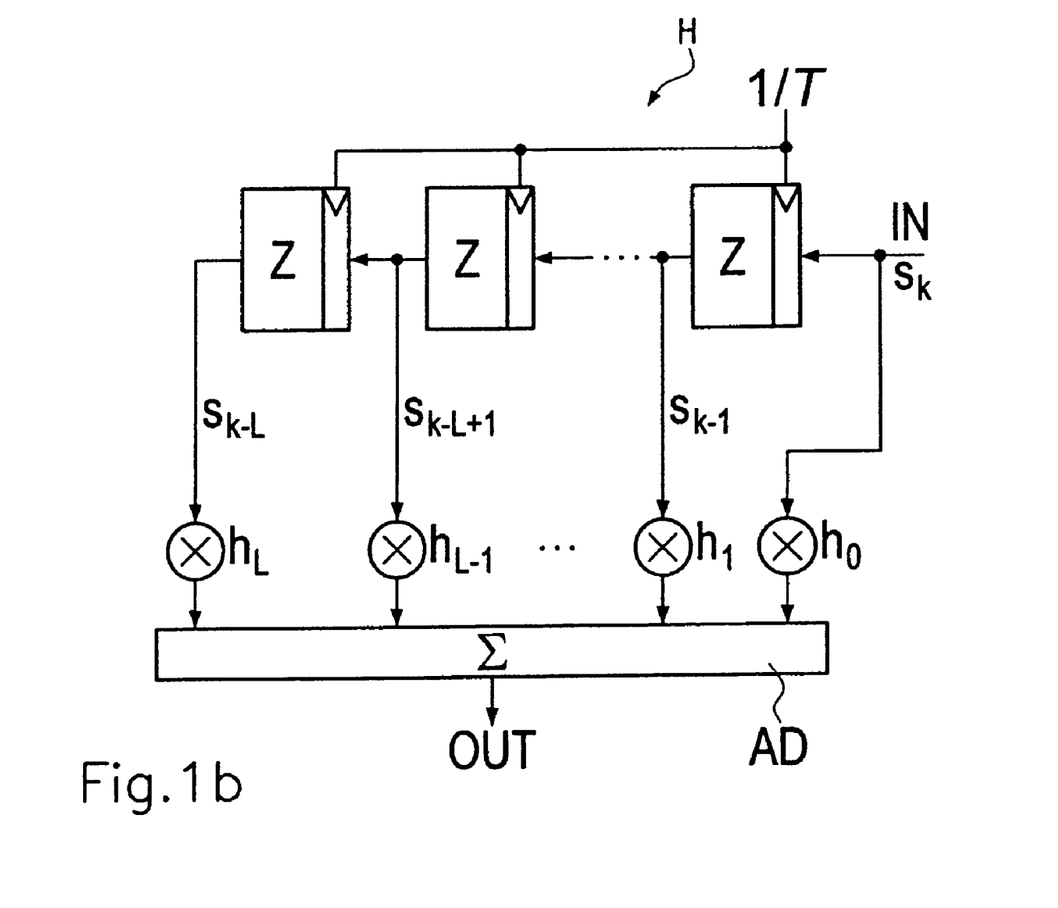
FIG. 1b shows the design of a filter for modeling of the transmission channel.

In this model, the state of the channel is described by the memory contents of the shift register. The memory content of the first memory cell on the input side contains the symbol $s_{k-1}$ (which is multiplied by $h_1$) in the time step k, while the further memory cells Z are occupied by the symbols $s_{k-2}$, $s_{k-3}, \ldots, s_{k-L}$. The state of the channel in the time step k is thus governed unambiguously by the indication of the memory contents, that is to say by the L-tuple ($s_{k-L}$, $s_{k-L+1}, \ldots, s_{k-1}$).

A shift register with L memory cells may have a total of $m^L$ different occupancies, where m denotes the number of possible versions of the symbol, that is to say its value. In general, the state of the channel can thus be defined by the L-tuple $$(s^{(v)}(1), s^{(v)}(2), \ldots, s^{(v)}(L)) \quad (2)$$

where $s^{(v)}(n)$ denotes the symbol with the index v at the n-th point in the L-tuple to the trellis state (that is to say $s^{(v)}(L)$ is the variable for the occupancy of the input-side memory cell Z of the shift register and $s^{(v)}(1)$ is the variable for the occupancy of the rearmost memory cell Z in the shift register).

Figure 2:
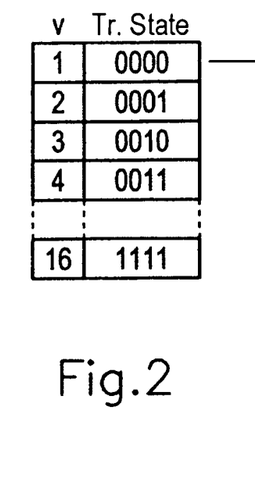
FIG. 2 shows an illustration of the trellis states for m=2 and $L_T$=4.

The 16 trellis states (possible shift register occupancies) for L=4 are shown in FIG. 2, based on a binary symbol alphabet.

The symbol $s_k$ which is supplied to the input side of the shift register for the k-th time step is stored in the input-side memory cell Z in the next time step k+1. The clock frequency of the shift register is 1/T, where T denotes the symbol or time step duration. Thus, in general, the memory content of each memory cell Z changes with each time step, since the stored symbols are in each case shifted to the next memory cell Z to the left.

The sequence of states which results in this case defines a path through a regular graph which is plotted against the discrete time k. This graph is referred to as the trellis diagram. The Viterbi algorithm determines the sequence of the states (path) through the trellis diagram in order to estimate the transmitted symbol sequence $S_k, S_{k+1}, \ldots$.

Figure 3:
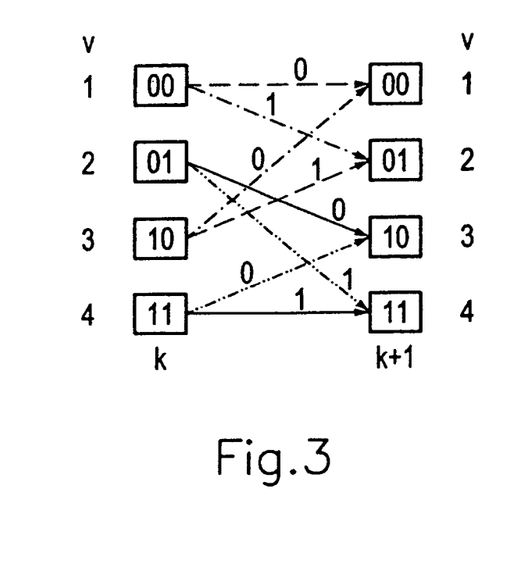
FIG. 3 shows a schematic illustration of a detail from a trellis diagram for m=2 and $L_T$=2 for a transition from the time step k to the time step k+1.

FIG. 3 shows a detail of the trellis diagram for the case where m=2 and L=2. There are only four channel states (0,0), (0,1), (1,0), (1,1). Each of the channel states relating to the time step k+1 can be reached by two (generally m) transitions starting from two (generally m) different possible previous states relating to the time step k. The possible transitions are illustrated by arrows in FIG. 3, with the transition symbol which produces the transition in each case being indicated alongside the arrow. In the previous recursion step, a path leading to this state had already been determined for each state relating to the time step k. The question is which of these two (generally m) paths which lead to the two (generally m) possible previous states relating to the time step k is that which, if it is continued to the target state in the time step k, will set up the shortest path to this target state.

By way of example, the target state (0,0) relating to the time step k+1 will be considered. The possible previous states are the states (0,0) and (1,0). In the course of the Viterbi equalization process relating to the k-th time step, it is necessary to decide which of these two previous states is the more probable.

In order to answer this question, a transition metric (sometimes also referred to as a metric increment) $I(v_k, v_{k+1})$ is calculated in the Viterbi algorithm for each of the transitions between one of the possible previous states and the target state under consideration, to be precise using the relationship:

$$I(v_k, v_{k+1}) = \left(x_k - \sum_{i=1}^{L} h_i s^{(v_k)}(L+1-i) + h_0 s_k\right)^2 \quad (3)$$

The transition metric is thus the Euclidean distance between the sample value $x_k$ and a value $$\sum_{i=1}^{L} h_i s^{(v_k)}(L+1-i) + h_0 s_k.$$

The latter value is also referred to as the reconstructed signal value of the transition metric and depends—as can be seen—on the previous state $v_k$ under consideration (that is to say the hypothesis for the occupancy of the channel model shift register) and the transition symbol $s_{-k}$ which results in the transition under consideration to the target state $v_{k+1}$. This means that each transition metric is calculated using the following rule:

Transition metric=|sample value−reconstructed signal value|

For example, for the example illustrated in FIG. 3, this results in:

$$I(1_k,1_{k+1})=(x_k-h_2*0-h_1*0-h_0*0)^2=x_k^2$$

$$I(3_k,1_{k+1})=(x_k-h_2*1-h_1*0-h_0*0)^2=(x_k-h_2)^2$$

$$I(1_k,2_{k+1})=(x_k-h_2*0-h*0-h_0*1)^2=(x_k-h_0)^2$$

$$I(3_k,2_{k+1})=(x_k-h_2*1-h_1*0-h_0*1)^2=(x_k-h_2-h_0)^2$$

etc.

Owing to the recursive method of calculation, a minimal metric relating to the time step k will already have been calculated for each of the two (generally: m) possible previous states with the index $v_k$. This is referred to as $Me(v_k)$. The path decision process for the time step k is carried out on the basis of these known two (generally m) minimal metrics for the possible previous states and for the calculated two (generally m) transition metrics $I(v_k,v_{k+1})$ for the associated transitions. This comprises three steps per target state:

By means of an addition step (ADD), the m candidates which are annotated me are calculated for the minimal metric of the target state $v_{k+1}$ under consideration as the sum of the respective minimal metric of one of the previous states and the associated transition metric using:

$$me(v_{k+1})=Me(v_k)+I(v_k,v_{k+1}) \quad (4).$$

By means of a comparison step (COMPARE) that of the m calculated metrics $me(v_{k+1})$ which has the minimum value is determined. This becomes the minimal metric $Me(v_{k+1})$ of the target state under consideration.

By means of a selection step (SELECT), that previous state of the m possible previous states is selected which is the point of origin of the transition to the state $v_{k+1}$ with the minimal metric $Me(v_{k+1})$. The correct previous state is determined in this way. The paths which lead to the other m−1 possible previous states are in this case terminated.

The three steps which have been mentioned are fundamental to Viterbi equalization. As already mentioned, they are known as ACS (ADD COMPARE SELECT) operations.

In plain words, m possible received values (the reconstructed signal values) are calculated in each ACS step for m hypotheses (possible previous states of the channel with respect to the time step k), taking into account the transmission characteristics of the channel (channel parameters $h_0,h_1,\ldots,h_L$) and are compared with the actually measured received value $x_k$. That reconstructed signal value which provides the best match with the measured received symbol $x_k$ contributes the least to the respective path sum (state metric) in the time step k. However, the "correct" previous state is not selected solely on the basis of the minimum transition metric but on the basis of an overall balance, in which the total path sums (previous path sum+calculated transition metric: that is to say, in the end, nothing more than the accumulated transition metrics along the path under consideration) are in each case compared with one another.

This clearly shows that ACS operations must normally be carried out "backward" in time (that is to say from k+1 to k), because they are linked to a specific target state relating to the time step k+1, but assess transitions starting from the time step k to this specific target state.

For data signals with more stages, the implementation complexity for Viterbi equalization increases drastically. While GSM (Global System for Mobile Communications) uses a binary (that is to say 2-stage) data signal, the new EDGE (Enhanced Data Services for GSM Evolution) Standard is based on the 8PSK modulation method, which is predicated on an 8-stage data signal (m=8). This means that 8 state transitions originate from each trellis state, and that 8 state transitions end in each trellis state. A channel modeled with L=5 would have $8^5$ possible channel states, for which an ACS operation would have to be carried out for each time step. The computation complexity required to do this is too great for practical applications.

One simple possible way to keep the computation complexity within acceptable limits is to base the Viterbi equalization process on a short channel memory (that is to say a low value for L). However, this has the disadvantage that this will have a severe adverse affect on the performance of the equalizer. It is better to carry out the Viterbi equalization on the basis of a reduced trellis diagram, based on the decision feedback method (DF). Furthermore, a "long" channel memory with a total of L+1 channel impulse responses is used for the calculation of the transition metrics and of the reconstructed signal values, but the path is determined on the basis of a reduced trellis diagram with only $m^{L_T}$ states, where $L>L_T$. The channel model thus still has a shift register with L memory cells, but only the first $L_T$ memory cells are used for definition of the channel states.

Equation 2 can then be replaced by the following expression:

$$(s^{(v)}(L-L_T+1),s^{(v)}(L-L_T+2),\ldots,s^{(v)}(L)) \quad (5)$$

For the reconstructed signal values, this results in:

$$\sum_{i=1}^{L} h_i s^{(v_k)}(L+1-i) + h_0 s_k = \sum_{i=1}^{L_T} h_i s^{(v_k)}(L+1-i) + h_0 s_k + \sum_{i=L_T+1}^{L} h_i s^{(v_k)}(L+1-i) \quad (6)$$

$$= \sum_{i=1}^{L_T} h_i s^{(v_k)}(L+1-i) + h_0 s_k + (h_{L_T+1} s^{(v_k)}(L-L_T) + \ldots + h_L s^{(v_k)}(1))$$

The procedure for carrying out Viterbi equalization according to the invention is described in the following text. This essentially comprises calculation of the reconstructed signal values as far as possible in advance after channel estimation, and of storing them in a suitable manner so that the reconstructed signal values can be used for the calculation of the transition metrics in the subsequent time steps simply by looking them up in a table memory (or in two table memories in the case of DF).

The notation used for a state in equation 5 has the disadvantage that it is dependent on L. The state definition $$(s^{(v)}(1), s^{(v)}(2), \ldots, s^{(v)}(L_T)) \quad (7)$$

which is independent of L is thus used instead of this notation, and, in the case of a non-reduced trellis diagram, is identical to the expression quoted in equation 5, and in the case of a reduced trellis diagram is obtained from it by index renumbering (subtraction of $L-L_T$). In the same way as in equation 5, only the $L_T$ input-side memory cells of the shift register are taken into account for definition of a trellis state in equation 7, with the only difference being that an increase in the number L+1 of measured channel parameters as in equation 7 has no influence on the notation of the trellis states.

After channel estimation, the $m^{L_T+1}$ expressions $$S(v, j) = \sum_{i=1}^{L_T} h_i s^{(v)}(L_T + 1 - i) + h_0 s(j) \quad (8)$$

$$j = 1, \ldots, m$$

$$v = 1, \ldots, m^{L_T}$$

are first of all calculated, and are stored in a first table memory TAB1 with $m^{L_T+1}$ memory locations. In this case, s(j), j=1, . . . ,m denotes the m symbols of the symbol alphabet, and $s^{(v)}(n)$ denotes the symbol in the n-th place in the $L_T$ tuple $(s^{(v)}(1), s^{(v)}(2), \ldots, s^{(v)}(L_T))$ with the index v, v=1, . . . ,$m^{L_T+1}$. As can be seen:

$$S(v, j) = \sum_{i=1}^{L_T} h_i s^{(v)}(L_T + 1 - i) + h_0 s(j)$$

provided that the notation given in equation 5 is used as the basis for a reduced trellis state.

The two cases of a non-reduced trellis diagram and of a reduced trellis diagram will be considered in the following text:

1. In the case of a non-reduced trellis diagram ($L=L_T$), a first table memory has $m^{L+1}$ memory locations, and a value $$S(v, j) = \sum_{i=1}^{L_T} h_i s^{(v)}(L_T + 1 - i) + h_0 s(j)$$

$$j = 1, \ldots, m$$

$$v = 1, \ldots, m^L$$

is stored in each memory location. In this case, the already calculated trellis contribution S(v,j) is identical to a reconstructed signal value of a transition metric, as is evident from comparison with equation 3, that is to say:

Reconstructed signal value=trellis contribution

Figure 4:
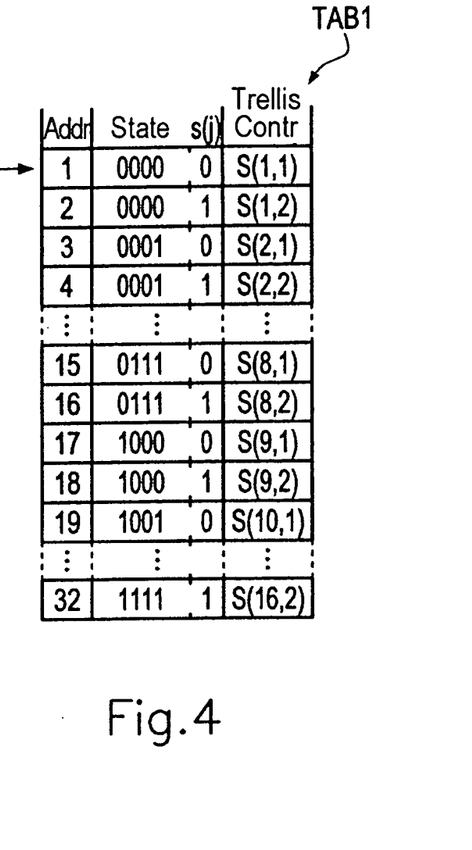
FIG. 4 shows a schematic illustration of the memory occupancy of a first table memory for storage of the trellis contributions for m=2 and $L_T$=4.

FIG. 4 shows the occupancy of the first table memory TAB1 with 32 trellis contributions (right-hand column) for the example in which m=2 and L=4. The left-hand column indicates the memory address, which may be selected using the equation Adr=j+(v−1)*m. The middle column indicates the associated trellis state (s(1),s(2),s(3),s(4)) as well as the symbol s(j) on which the calculation of the trellis contribution is based. The middle column has been added only to assist the explanation of the illustration in FIG. 4, and does not represent any memory entries.

The trellis contributions S(v,j) are determined immediately after each channel estimation process, and are stored in the first table memory TAB1. All the reconstructed signal values are thus known, and are continuously available. The first table memory TAB1 is updated only after a new channel estimation process takes place, that is to say the memory contents remain unchanged over a large number of time steps.

When calculating the transition metrics in the course of processing of the ACS operations based on equation 3, the required reconstructed signal value is simply read as the trellis contribution S(v,j) for the (previous) state v under consideration and the transition symbol s(j) for the transition under consideration from the first table memory TAB1. The transition metrics are calculated in the normal way as in the prior art, butterfly-for-butterfly. This is preferably done in the forward direction, starting from a specific previous state $v_k$ relating to the time step k. The reconstructed signal values which are required for the m transition metrics relating to this previous state may be read by m-times incrementation of the lowest memory address pointing to this state. The advantage is that, with address occupancy such as this, simple counting is sufficient to "calculate" the access address.

2. In the DF case ($L>L_T$), further channel parameters are to be taken into account in order to calculate the reconstructed signal values for the transition metrics. According to the invention, after a channel estimation process (but before the processing of the ACS operations), $m^{df}$ decision feedback contributions are also calculated using the equation $$DF(j_1, \ldots, j_{df}) = h_{L_T+1} s(j_1) + \ldots + h_L s(j_{df}) \quad (9),$$

in which case the state indices $j_1, \ldots, j_{df}$ may in each case assume the values 1, . . . ,m. The abbreviation $L-L_T=df$ is used.

The $m^{df}$ decision feedback contributions are stored in a second table memory TAB2 with mdf memory locations. The second table memory TAB2 need be updated only when the channel parameters are re-estimated, in precisely the same way as the first table memory TAB1.

Figure 5:
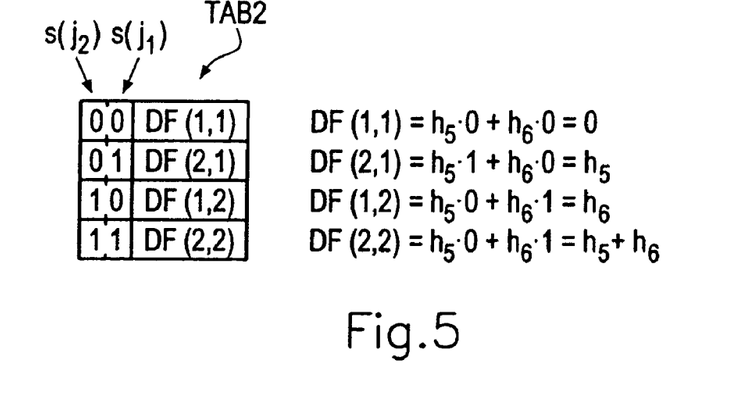
FIG. 5 shows a schematic illustration of the possible decision feedback contributions for the case where m=2, $L_T$=4 and L=6, as well as the memory occupancy of a second table memory.

FIG. 5 shows the memory occupancy of the second table memory TAB2 for the case where m=2, L=6 and $L_T=4$. The values for $s(j_1)$ and $s(j_2)$ are indicated in the left-hand column. The right-hand column contains the four decision feedback contributions DF(1,1)=0, DF(2,1)=$h_5$, DF(1,2)=$h_6$ and DF(2,2)=$h_5+h_6$.

Equation 3 can be written as follows, in the DF case:

$$I(v_k, v_{k+1}) = \left(x_k - \left(\sum_{i=L_T+1}^{L} h_i s^{(v_k)}(L+1-i) + \sum_{i=1}^{L_T} h_i s^{(v_k)}(L+1-i) + h_0 s_k\right)\right)^2 \quad (10)$$

$$= \left(x_k - \left(DF(j_1^{(v_k)}, \ldots, j_{df}^{(v_k)}) + S(v_k, j)\right)\right)^2$$

A reconstructed signal value which is required for the calculation of a transition metric thus comprises a trellis contribution $S(v_{k,j})$ according to equation 8 (using the state definition indicated in equation 7) and a DF contribution $$DF(j_1^{(v_k)}, \ldots, j_{df}^{(v_k)}):$$

Reconstructed signal value=trellis contribution+DF contribution

The calculation could thus be carried out by addition of a value that has been read from the first table memory TAB1 to a value which has been read from the second table memory TAB2. The notation $$j_1^{(v_k)}, \ldots, j_{df}^{(v_k)}$$

is intended to indicate that the indices $j_1, \ldots, j_{df}$ depend on the state $v_k$ under consideration.

Figure 6:
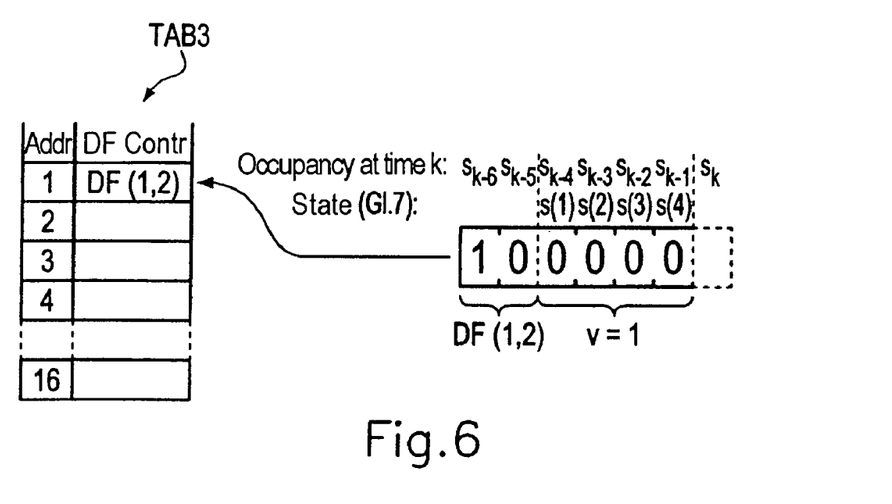
FIG. 6 shows the allocation of a decision feedback contribution to a trellis state of a reduced trellis diagram for the time step k, as well as the memory occupancy of a third table memory.

FIG. 6 explains the association that is required for this purpose between a trellis state $v_k$ relating to the time step k and the decision feedback contribution $DF(j_1, \ldots, j_{df})$, which was calculated in advance using equation 9 and is stored in the table TAB2, for the example where L=6, $L_T$=4 and m=2.

Additional information about the two previous symbols $s_{k-5}$ and $s_{k-6}$ is available for each trellis state which is given by the (assumed) symbols $s_{k-1}$, $s_{k-2}$, $s_{k-3}$ and $s_{k-4}$ which were most recently fed into the channel. In the trellis diagram, the two previous symbols $s_{k-5}$ and $s_{k-6}$ correspond to additional information relating to the trellis state which is defined by the symbols $s_{k-1}$, $s_{k-2}$, $s_{k-3}$ and $s_{k-4}$ and is given by the path leading to this state. In the example illustrated in FIG. 6, the additional information $s_{k-6}$=1 and $s_{k-5}$=0 relating to the trellis state v=1 is given by the 4-tuple (s(1),s(2),s(3), s(4))=(0,0,0,0), based on the notation indicated in equation 7. According to the second table memory TAB2, the additional information points to the decision feedback contribution DF(1,2). In an analogous manner, one of the four decision feedback contributions in the second table memory TAB2 (illustrated in FIG. 5) is allocated to each of the 16 states, corresponding to the respective path profiles in the trellis diagram as determined at the receiver end.

In other words, the respective previously calculated decision feedback contribution $DF(j_1, \ldots, j_{df})$ where $$j_1, \ldots, j_{df} = j_1^{(v_k)}, \ldots, j_{df}^{(v_k)}$$

can be determined for each previous state $v_k$ on the basis of the path-related additional information $$j_1^{(v_k)}, \ldots, j_{df}^{(v_k)}.$$

According to the invention, provision can now be made, before each processing of the ACS operations relating to one time step k, for a third table memory TAB3 with $m^{L_T}$ memory locations (a total of 16 in this case) to be described by the decision feedback contribution associated with each trellis state $v_k$ in this time step. The third table memory TAB3 thus contains the DF contributions from the second table memory TAB2, but indexed on the basis of trellis states. The third table memory TAB3 must be updated in each time step k, in contrast to the first and second table memories TAB1, TAB2.

The memory occupancy of the third table memory TAB3 is indicated in the right-hand column of the table illustrated in the left-hand part of FIG. 6. The left-hand column relates to the memory address, which may be selected, for example, on the basis of the relationship Adr=v, that is to say corresponding to the state index v.

In the example shown here, the state (0,0,0,0) with the index v=1 in the time step k is associated with the decision feedback contribution DF(1,2). DF(1,2) is thus stored in the k-th time step at the memory address 1(=$v_k$) in the third table memory TAB3. The entire third table memory TAB3 is filled in a corresponding manner.

For the calculation of the m reconstructed signal values in the course of the ACS operations relating to the time step k regarding a specific previous state, m accesses are required to the first table memory TAB1 (with the access address being incremented) and one access to the third table memory TAB3. In the example described here, access is made to the first two memory addresses Adr=1 and 2 in the first table memory TAB1 and to the first memory address Adr=1 in the third table memory TAB3 starting from the trellis (previous) state v=1, in order to calculate the transition metrics. Access is made to the addresses Adr=3 and 4 in the first table memory TAB1 and to the address Adr=2 in the third table memory TAB3 starting from the (previous) state with the index v=2 in order to calculate the transition metrics, and so on. If m=8 (that is to say in the case of 8PSK modulation), 8 memory accesses are required to the first table memory TAB1 and one access to the third table memory TAB3 in order to calculate the transition metrics for a previous state.

Thus, in the case of DF, access is also required to the second or third table memory TAB2, TAB3 in order to calculate the transition metrics. The two embodiment variants (with and without DF) have the common feature that the trellis contribution S(v,j), which was defined (solely) by the trellis state, is always available, completely calculated in advance, in the first table memory TAB1.

Figure 7A:
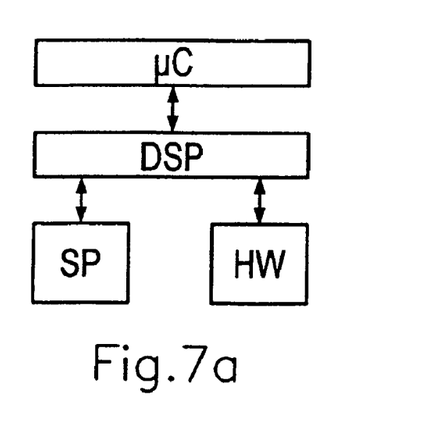
FIG. 7a shows a block diagram in order to explain the design of a conventional Viterbi equalizer.

The invention allows the Viterbi algorithm to be processed solely in software. FIG. 7a shows the design of a conventional Viterbi equalizer as used in the field of mobile radios. The equalizer has a microcontroller μC and a digital signal processor DSP. The DSP is connected via suitable interfaces to a hardware circuit HW and to a memory SP. The hardware circuit HW carries out, for example, the computation steps for the ACS operation in hardware, and is programmed in a suitable manner by the DSP.

Figure 7B:
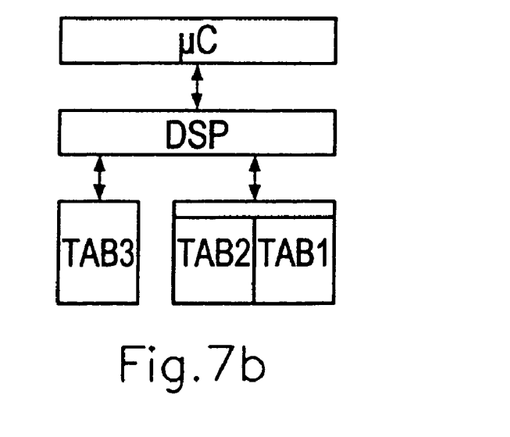
FIG. 7b shows a block diagram in order to explain the design of a Viterbi equalizer according to the present invention.

The equalizer concept illustrated in FIG. 7b can be implemented according to the invention. This likewise comprises a microcontroller μC and a DSP. However, there is no hardware circuit corresponding to HW. Instead of this, and in the manner already described for the calculation of the transition metrics, the DSP accesses the first table memory TAB1 and, possibly, the second table memory TAB2 and/or the third table memory TAB3. All of the calculations, in particular the ACS operations, are carried out exclusively in the DSP, that is to say on a software basis by processing of an appropriate program. The separation of the third table memory TAB3 from the first and second table memories TAB1 TAB2 as illustrated in FIG. 7b is intended to indicate solely the different updating frequency of these memories (once per time step and once per channel estimation process, respectively).

What is claimed is:

1. A method for equalization of a data signal which is transmitted via a channel and in which, on the basis of the Viterbi algorithm, transition metrics are determined between trellis states as the distance between a signal value measured at the receiver end and a reconstructed signal value which is characteristic of the state transition and of the channel transmission response, comprising the steps of:

estimating L+1 channel parameters $h_0, h_1, \ldots, h_L$ of the channel, where L is an integer greater than zero; on the basis of $L_{T+1}$ estimated channel parameters $h_0, h_1, \ldots, h_{L_T}$, calculating a trellis contribution for each of the $m^{L_T+1}$ possible reconstructed signal values, with $L_T$ being the number of symbols which define a trellis state and m indicates their value, and where $L-L_T=df \geq 1$;

calculating $m^{df}$ decision feedback contributions based on the df channel parameters $h_{L_T+1}, \ldots, h_L$;

storing the trellis contributions in a first table memory;

storing the decision feedback contributions in a second table memory;

before carrying out add compare select (ACS) operations for a specific time step, re-storing of the decision feedback contributions in a third table memory with a state-indexed address;

carrying out the ACS operations over multiple time steps, wherein the re-storage from the second to the third table memory being carried out once again in each subsequent time step, and with each reconstruction signal value which is required for the calculation of a transition metric being determined by access to the first table memory and to the third table memory.

2. The method as claimed in claim 1, wherein a trellis contribution is calculated using $$S(v, j) = \sum_{i=1}^{L_T} h_i s^{(v)}(L_T + 1 - i) + h_0 s(j),$$

where m denotes the value of the symbols on which the data signal is based, $s(j), j=1, \ldots, m$ denotes these m symbols and the $L_T$ tuple indicates a trellis state with the index v, $v=1, \ldots, m^{L_T}$, while $s^{(v)}(n), n+1, \ldots, L_T$ denotes the symbol which is in the n-th place in the $L_T$ tuple.

3. The method as claimed in claim 1, wherein each trellis contribution is determined by a single read access to the first table memory.

4. The method as claimed in claim 1, wherein the trellis contributions are stored in the first table memory with respect to a state index v at sequential memory addresses, in particular at the addresses Adr=j+(v−1)*m for indexing of the $m^{L_T}$ trellis states where $v=1, \ldots, m^{L_T}$.

5. The method as claimed in claim 4, wherein in order to determine the $m^{L_T}+1$ trellis contributions which are required for the ACS operations for one time step, the address thereof is incremented or decremented for access to the first table memory.

6. The method as claimed in claim 1, wherein the $m^{df}$ decision feedback contributions are calculated using $DF(j^1, \ldots, j^{df})=h_{L_T+1}S(j_1)+ \ldots +h_L s(j_{df})$, where the indices $J_1, \ldots, j_{df}$ may each assume the values $1, \ldots, m$, and $s(\cdot)$ is the symbol which is determined by the respective index $j_1, \ldots, j_{df}$.

7. The method as claimed in claim 1, wherein for a state index on the basis of $v=m^L_T$, the decision feedback contribution to be taken into account for the trellis state with the index v for the time step k is stored at the address Adr=v in the third table memory.

8. The method as claimed in claim 1, wherein with respect to one time step for determination of the $m^{L_T+1}$ reconstructed signal values for each trellis state, m read accesses are made to the first table memory and one read access is made to the third table memory, and each reconstructed signal value is obtained by addition of a trellis contribution, which is read from the first table memory, and a decision feedback contribution which is read from the third table memory.

9. The method as claimed in claim 8, wherein read accesses to the first and third table memories are made in the course of processing the ACS operations for one time step, with the respective access addresses being incremented and/or decremented.

10. An apparatus, designed for equalization of a data signal which is transmitted via one channel comprising:

a first table memory which uses $m^{L_T+1}$ memory locations, a second table memory, which uses $m^{L-L_T}$ memory locations, for storage of decision feed back contributions, a third table memory, which uses $m^{L_T}$ memory locations, for state-indexed storage of the decision feedback contributions for each time step, a processor, which has an access to the table memories, for calculation of the transition metrics for carrying out add compare select (ACS) operations wherein m and L are integers greater than zero.

11. The apparatus as claimed in claim 10, wherein the processor is designed to calculate the ACS operations solely in software, without hardware assistance.

12. The apparatus as claimed in claim 10, wherein the processor is coupled with the first table memory in such a way that it has single read access to the first table memory.

13. The apparatus as claimed in claim 10, comprising means for incrementing or decrementing the access to the first table memory.

14. An apparatus for equalization of a data signal which is transmitted via a channel and in which, on the basis of the Viterbi algorithm, transition metrics are determined between trellis states as the distance between a signal value measured at the receiver end and a reconstructed signal value which is characteristic of the state transition and of the channel transmission response, comprising:

means for estimating L+1 channel parameters $h_0, h_1, \ldots, h_L$ of the channel, where L is an integer greater than zero;

means for, on the basis of $L_T+1$ estimated channel parameters $h_0, h_1, \ldots, h_{L_T}$, calculating a trellis contribution for each of the $m^{L_T+1}$ possible reconstructed signal values, with $L_T$ being the number of symbols which define a trellis state and m indicates their value, and where $L-L_T=df \geq 1$;

means for calculating $m^{df}$ decision feedback contributions based on the df channel parameters $h_{L_T+1}, \ldots, h_L$;

means for storing the trellis contributions in a first table memory;

means for storing the decision feedback contributions in a second table memory; means for, before carrying out add compare select (ACS) operations for a specific time step, re-storing of the decision feedback contributions in a third table memory with a state-indexed address;

means for carrying out the ACS operations over multiple time steps, wherein the re-storage from the second to the third table memory being carried out once again in each subsequent time step, and with each reconstruction signal value which is required for the calculation of a transition metric being determined by access to the first table memory and to the third table memory.

15. The apparatus as claimed in claim 14, wherein the calculation means calculate a trellis contribution using $$S(v, j) = \sum_{i=1}^{L_T} h_i s^{(v)}(L_T + 1 - i) + h_0 s(j),$$

where m denotes the value of the symbols on which the data signal is based, $s(j)$, $j=1, \ldots, m$ denotes these m symbols and the $L_T$ tuple indicates a trellis state with the index v, $v=1, \ldots, m^{L_T}$, while $s^{(v)}(n)$, $n+1, \ldots, L_T$ denotes the symbol which is in the n-th place in the $L_T$ tuple.

16. The apparatus as claimed in claim 14, wherein each trellis contribution is determined by a single read access to the first table memory.

17. The apparatus as claimed in claim 14, wherein the trellis contributions are stored in the first table memory with respect to a state index v at sequential memory addresses, in particular at the addresses $\text{Adr}=j+(v-1)*m$ for indexing of the $m^{L_T}$ trellis states where $v=1, \ldots, m^{L_T}$.

18. The apparatus as claimed in claim 17, wherein in order to determine the $m^{L_T+1}$ trellis contributions which are required for the ACS operations for one time step, the address thereof is incremented or decremented for access to the first table memory.

19. The apparatus as claimed in claim 14, wherein the $m^{df}$ decision feedback contributions are calculated using $DF(j_1, \ldots, j_{df})=h_{L_T+1}s(j_1)+ \ldots +h_{L\ s(j_{df})}$, where the indices $j_1, \ldots, j_{df}$ may each assumue the values $1, \ldots, m$, and $s(\cdot)$ is the symbol which is determined by the respective index $j_1, \ldots, j_{df}$.

20. The apparatus as claimed in claim 14, wherein for a state index on the basis of $v=1, \ldots, m^{L_T}$, the decision feedback contribution to be taken into account for the trellis state with the index v for the time step k is stored at the address $\text{Adr}=v$ in the third table memory.

* * * * *

UNITED STATES PATENT AND TRADEMARK OFFICE
CERTIFICATE OF CORRECTION

PATENT NO. : 7,333,572 B2
APPLICATION NO. : 10/841120
DATED : February 19, 2008
INVENTOR(S) : Anish Nair et al.

It is certified that error appears in the above-identified patent and that said Letters Patent is hereby corrected as shown below:

On the Title Page Item -56-

Under Other Publications, page 1, line 2, "Translations" should read --Transactions--

On the Title Page Item -56-

Under Other Publications, page 2, column 2, line 6, "Globel" should read --Global--

At column 2, line 10 "minimum is selected," should read --minimum, is selected,--

At column 4, line 54, "mdf" should read --$m^{df}$--

At column 7, line 24, "$I(1_k,2_{k+1})=(x_k-h_2*0-h*0-h_0*1)=(x_k-h_0)^2$" should read --$I(1_k,2_{k+1})=(x_k-h_2*0-h_1*0-h_0*1)^2=(x_k-h_0)^2$--

At column 8, line 3, "the "correct"previous" should read --the "correct" previous--

At column 9, line 36, " $m^{L_T+1}$ . " should read -- $m^{L_T}$ . --

At column 9, line 54, " $s(v,j)=\sum_{i=1}^{L_T}h_i s^{(v)}(L_T+1-i)+h_0 s(j)$ " should read -- $s(v,j)=\sum_{i=1}^{L}h_i s^{(v)}(L+1-i)+h_0 s(j)$ --

At column 10, line 45, "mdf memory locations." should read --$m^{df}$ memory locations.--

At column 12, line 26, "memory TAB3" should read --memory TAB3,--

At column 12, line 64, "TAB1 TAB2" should read --TAB1, TAB2--

UNITED STATES PATENT AND TRADEMARK OFFICE
CERTIFICATE OF CORRECTION

PATENT NO. : 7,333,572 B2
APPLICATION NO. : 10/841120
DATED : February 19, 2008
INVENTOR(S) : Anish Nair et al.

It is certified that error appears in the above-identified patent and that said Letters Patent is hereby corrected as shown below:

At column 13, in Claim 2, line 45, "n+1" should read --n=1--

At column 13, in Claim 6, line 64, "$DF(j^1,\ldots,j^{df}) = h_{L_T+1}S(j_1)+\ldots+h_L s(j_{df}),$" should read --$DF(j_1,\ldots,j_{df}) = h_{L_T+1}s(j_1)+\ldots+h_L s(j_{df}),$--

At column 14, in Claim 7, line 2, "$v=m^L{}_T$," should read --$v=1,\ldots,m^{L_T}$, --

At column 15, in Claim 15, line 19, "n+1" should read --n=1--

At column 16, in Claim 17, line 5, "frellis" should read --trellis--

At column 16, in Claim 19, line 15, "assumue" should read --assume--

Signed and Sealed this

Twenty-ninth Day of April, 2008

JON W. DUDAS
*Director of the United States Patent and Trademark Office*